(No Model.)

C. MALLENCAFF.
HORSE COLLAR.

No. 393,251. Patented Nov. 20, 1888.

Witnesses:-
Louis W. T. Whitehead.
Wm. F. Henning.

Inventor:-
Christopher Mallencaff.
by:- Dayton, Poole & Brown
Attorneys.-

UNITED STATES PATENT OFFICE.

CHRISTOPHER MALLENCAFF, OF MALTA, ILLINOIS.

HORSE-COLLAR.

SPECIFICATION forming part of Letters Patent No. 393,251, dated November 20, 1888.

Application filed August 31, 1888. Serial No. 284,217. (No model.)

*To all whom it may concern:*

Be it known that I, CHRISTOPHER MALLENCAFF, of Malta, in the county of De Kalb and State of Illinois, have invented certain new and useful Improvements in Horse-Collars; and I do hereby declare that the following is a full, clear, and exact description thereof, reference being had to the accompanying drawings, and to the letters of reference marked thereon, which form a part of this specification.

This invention relates to improvements in horse-collars which are worn by the animal upon its neck and upon which the hames are supported.

The principal feature of improvement herein consists in making the collar entirely of a soft absorbent material—such as felt—and will be more fully hereinafter explained, and specifically pointed out in the appended claims.

Figure 1:
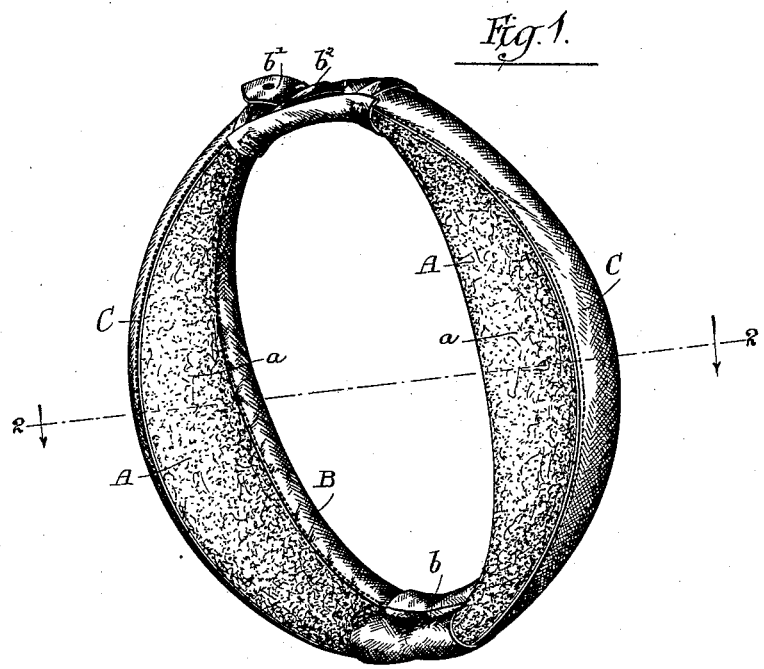
Figure 2:
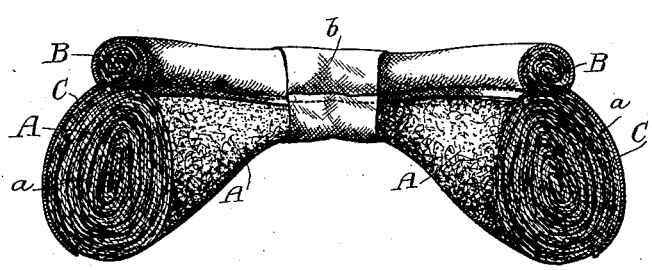

In the drawings, Figure 1 is a perspective view of the horse-collar embodying my invention; and Fig. 2 is a somewhat enlarged sectional view of the same, taken on line 2 2 of Fig. 1.

In carrying out my invention I employ a sheet of soft absorbent material—such as felt—and I form the same into a horse collar by making a continuous roll thereof.

In the drawings, A is the material or felt wound into a roll, $a$, of the size desired to make or form the body of the collar.

B is the second roll attached to or integral with the roll $a$ and much smaller than the latter. The junction of the rolls B and $a$ affords a convenient place for the hames to fit. The collar may be made in two parts and united in any ordinary manner—as, for example, at the bottom—by the stitching, and the joint then covered with leather band $b$. The ends at the top are united by the strap and buckle $b'$ $b^2$.

Upon the outside of the collar I place a shield of leather, C, which latter, as shown, covers the outer face of the roll $a$, and also of the roll B. This covering is placed upon the felt to protect the latter from being too quickly worn out by the hames and by the trace-buckles.

It will be noticed that the felt lies directly upon the horse's shoulders and neck, and, being of an absorbent material, prevents undue sweating. This material makes the load upon the neck very easy and gentle when the animal suddenly starts or goes forward.

I am aware that heretofore pads of felt and other soft material have been used between the collar itself and the animal, and I do not claim such construction.

What I do claim is—

1. As an improved article of manufacture, a horse-collar consisting of a sheet of felt rolled into the desired shape.

2. As an improved article of manufacture, a horse-collar consisting of the main portion $a$ and a smaller portion, B, each formed of a sheet of felt, in combination with a protecting-shield, C, substantially as specified.

In testimony that I claim the foregoing as my invention, I affix my signature in presence of two witnesses.

CHRISTOPHER MALLENCAFF.

Witnesses:
JAMES R. WILLIS,
W. H. HAISH.

Affidavit having been filed showing that the name of the patentee in Letters Patent No. 393,251, granted November 20, 1888, for an improvement in "Horse-Collars," should have been written and printed *Christopher Mollencoff*, instead of "Christopher Mallencaff," it is hereby certified that the proper correction has been made in the files and records pertaining to the case in the Patent Office, and should be read in the Letters Patent that the same may conform thereto.

Signed, countersigned, and sealed this 5th day of February, A. D. 1889.

[SEAL.]

D. L. HAWKINS,
*Assistant Secretary of the Interior.*

Countersigned:

BENTON J. HALL,
*Commissioner of Patents.*